US008325230B1

(12) United States Patent
Pattikonda et al.

(10) Patent No.: US 8,325,230 B1
(45) Date of Patent: Dec. 4, 2012

(54) SYSTEM AND METHOD FOR DISPLAYING INFORMATION BASED ON AUDIENCE FEEDBACK

(76) Inventors: Ram Pattikonda, Humble, TX (US); Shariq Hamid, Plano, TX (US)

( * ) Notice: Subject to any disclaimer, the term of this patent is extended or adjusted under 35 U.S.C. 154(b) by 930 days.

(21) Appl. No.: 12/407,307

(22) Filed: Mar. 19, 2009

(51) Int. Cl.
*H04N 7/18* (2006.01)

(52) U.S. Cl. ........................................ 348/143; 348/169

(58) Field of Classification Search .................. 348/143, 348/169
See application file for complete search history.

(56) References Cited

U.S. PATENT DOCUMENTS

| | | | | | |
|---|---|---|---|---|---|
| 5,365,266 | A * | 11/1994 | Carpenter | ....................... | 348/61 |
| 2008/0154623 | A1* | 6/2008 | Derker et al. | ..................... | 705/1 |
| 2009/0060256 | A1* | 3/2009 | White et al. | .................. | 382/100 |
| 2010/0138874 | A1* | 6/2010 | Deutschman | .................. | 725/60 |
| 2010/0225654 | A1* | 9/2010 | Theis | ............................ | 345/520 |
| 2010/0321493 | A1* | 12/2010 | Huber et al. | .................. | 348/143 |
| 2011/0203147 | A1* | 8/2011 | Van Herpen et al. | ........... | 40/541 |
| 2011/0271295 | A1* | 11/2011 | Redmann et al. | ............... | 725/13 |

* cited by examiner

*Primary Examiner* — Philip B Tran
(74) *Attorney, Agent, or Firm* — Michael Diaz

(57) ABSTRACT

A system and method for illuminating a seat and a system and method for displaying information in response to audience feedback. The system includes a camera for capturing an image of the auditorium and a computer for receiving the captured image. The computer analyzes the image to detect seats in the auditorium. The computer maps seats within the captured image to determine a specified seat. The system also includes a projector for illuminating the specified seat. The system also may display information based on audience feedback. The system includes a camera for capturing an image of audience members and a computer for receiving and analyzing the captured image. A query is presented to the audience members which requires a visual response. The computer compiles the visual responses to form a result of the query. Information based on the result is then display by a projector to the audience members.

17 Claims, 6 Drawing Sheets

Go to FIG. 5B

SYSTEM AND METHOD FOR DISPLAYING INFORMATION BASED ON AUDIENCE FEEDBACK

RELATED APPLICATIONS

This utility application claims the benefit of U.S. Utility patent application Ser. No. 11/555,869 by Ram Pattikonda filed Nov. 2, 2006, now U.S. Pat. No. 8,228,382, which claims the benefit of U.S. Provisional Patent Application Ser. No. 60/733,417 by Ram Pattikonda, filed Nov. 5, 2005, and U.S. Provisional Patent Application No. 61/037,966 filed Mar. 19, 2008 by Ram Pattikonda and Shariq Hamid and is hereby incorporated by reference.

BACKGROUND OF THE INVENTION

1. Field of the Invention

This invention relates to visual image recognition systems. Specifically, and not by way of limitation, the present invention relates to a system and method for displaying information based on audience feedback.

2. Description of the Related Art

The use of auditoriums, such as cinema halls or concert halls, is commonly dark, making it difficult for the audience members to find their assigned seats. Another problem is that there are audience members, either inadvertently or consciously, sitting in seats to which they are not authorized. Currently, the seating of the audience is carried out by ushers. This method suffers the disadvantage of adding to labor costs as well as disturbing the sitting audience with ushers using flash lights.

In addition, there is a need to bring additional forms of entertainment to seated audience during pre-show and intermission. One such form of entertainment is interactive cinema where the audience, as a group, provides inputs to their views as a response to what is displayed on a screen. Based on these responses, specific action is taken, such as displaying a winner from the audience, changing the story line of a movie, delivering food to audience members or utilizing the feedback information for market research. In existing systems, feedback from audience is commonly received through the use of electronic input devices located at each seat. This is an expensive solution which involves a large number of input devices, controllers and extensive wiring within an auditorium. In addition, this system is prone to failure by rough handling from the audience.

It would be advantageous to have a system which utilizes a camera based machine vision system to identify the visual or other types of feedback from individual audience members and a projection system to display the information on the walls, screen or the seats of the auditorium. In addition, it would be advantageous to have a system and method enabling the illumination of a seat in a darkened room. It is an object of the present invention to provide such a method and system.

SUMMARY OF THE INVENTION

In one aspect, the present invention is directed to a system for illuminating a seat in an auditorium. The system includes a camera for capturing an image of the auditorium and a computer for receiving the captured image. The computer analyzes the image to detect seats in the auditorium. The computer maps seats within the captured image to determine a specified seat. The system also includes a projector for illuminating the specified seat. The system may determine if a seat is empty and illuminate the empty seat to direct an audience member to the seat. The system may also scan a ticket to determine an assigned seat and illuminate the assigned seat.

In another aspect, the present invention is a method of illuminating a seat in an auditorium. The method begins by capturing an image of the auditorium by a camera. Next, the captured image is analyzed to detect seats in the image. The seats are then mapped in the captured image to determine a specific seat. The specified seat is then illuminated by a projector. An empty seat may be determined from the image and illuminated. For assigned seating, a ticket may be scanned to determine an assigned seat which may be illuminated.

In another aspect, the present invention is directed to a system for displaying information based on audience feedback. The system includes a camera for capturing an image of audience members and a computer for receiving and analyzing the captured image. A query is presented to the audience members which requires a visual response. The computer compiles the visual responses to formulate a result of the query. The computer then determines information based on the results for display by a projector to the audience members.

In another aspect, the present invention is directed to a method of displaying information based on audience feedback. The method begins by presenting a query requiring a visual response to audience members. Next, an image of the audience members is captured by a camera. A visual response is recognized and compiled for each audience member to formula a result to the query. Next, information based on the result is displayed to the audience members.

DESCRIPTION OF THE INVENTION

Figure 1:
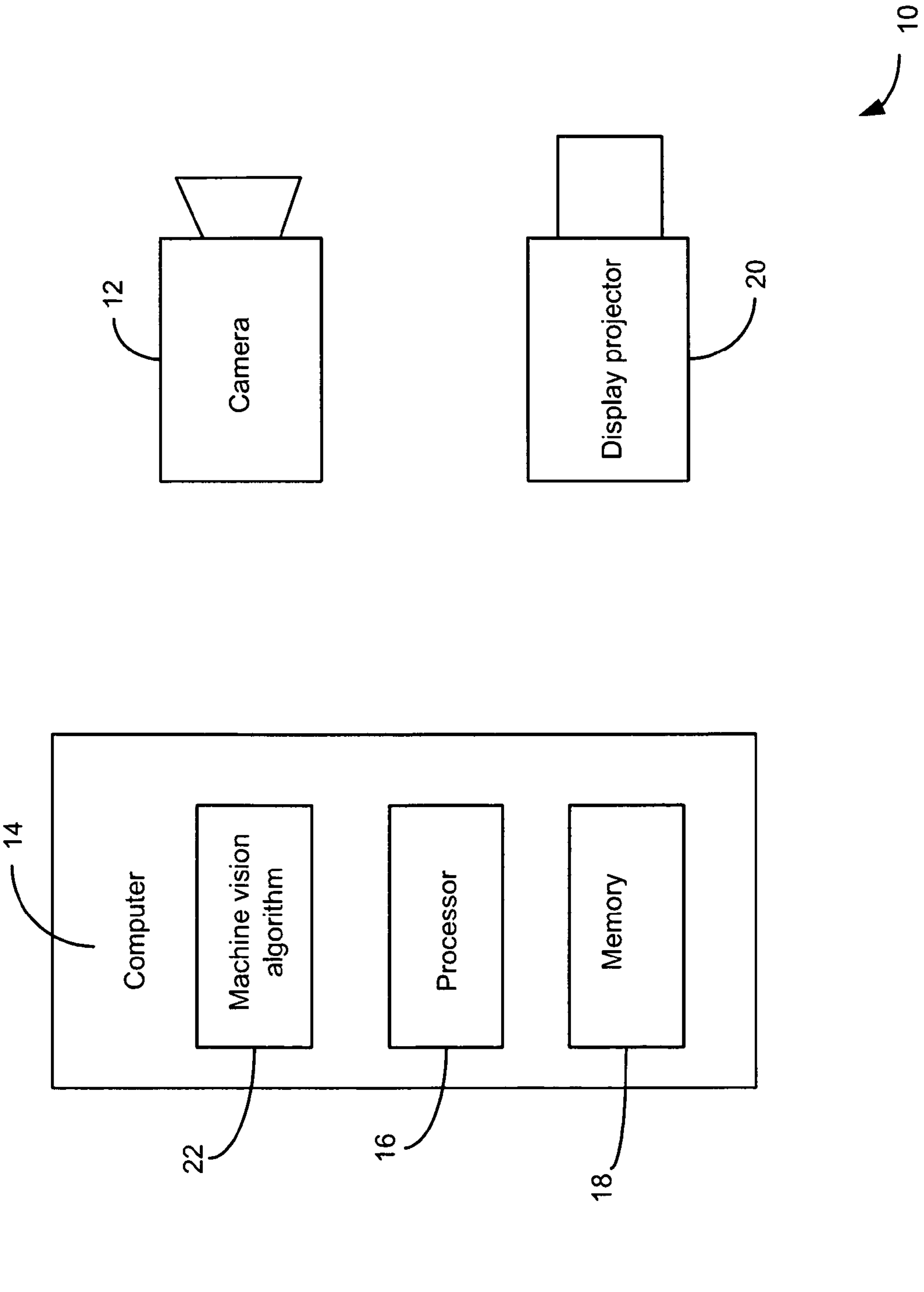
FIG. 1 is a simplified block diagram illustrating the components of a display system in the preferred embodiment of the present invention.

The present invention is a system and method for displaying information based on audience feedback. FIG. 1 is a simplified block diagram illustrating the components of a display system 10 in the preferred embodiment of the present invention. The system includes a camera 12 communicating with a computer 14. The computer includes a processor 16 and a memory 18. In addition, the system includes a display projector 20.

The camera 12 is preferably a high resolution digital camera with a wide angle lens to cover the entire auditorium. In the case of very large auditoriums, the present invention may utilize more than one camera. The camera is preferably capable of taking photographs or video in pre-show bright illumination or during show dark illumination using adjustable sensitivity and exposure of the camera. The computer 14 controls the camera 12 and acquires the images from the camera. The computer includes a machine vision algorithm 22 in the computer which identifies the presence of individuals in their seats or identifies a particular response from each audience member. The display system also utilizes the display projector 20, such as a digital light processing/liquid crystal display (DLP/LCD) or Laser projector. The projector provides information commanded by the computer in the seat or wall/ceiling areas of the auditorium. The camera, display projector and computer form a closed loop system.

Figure 2:
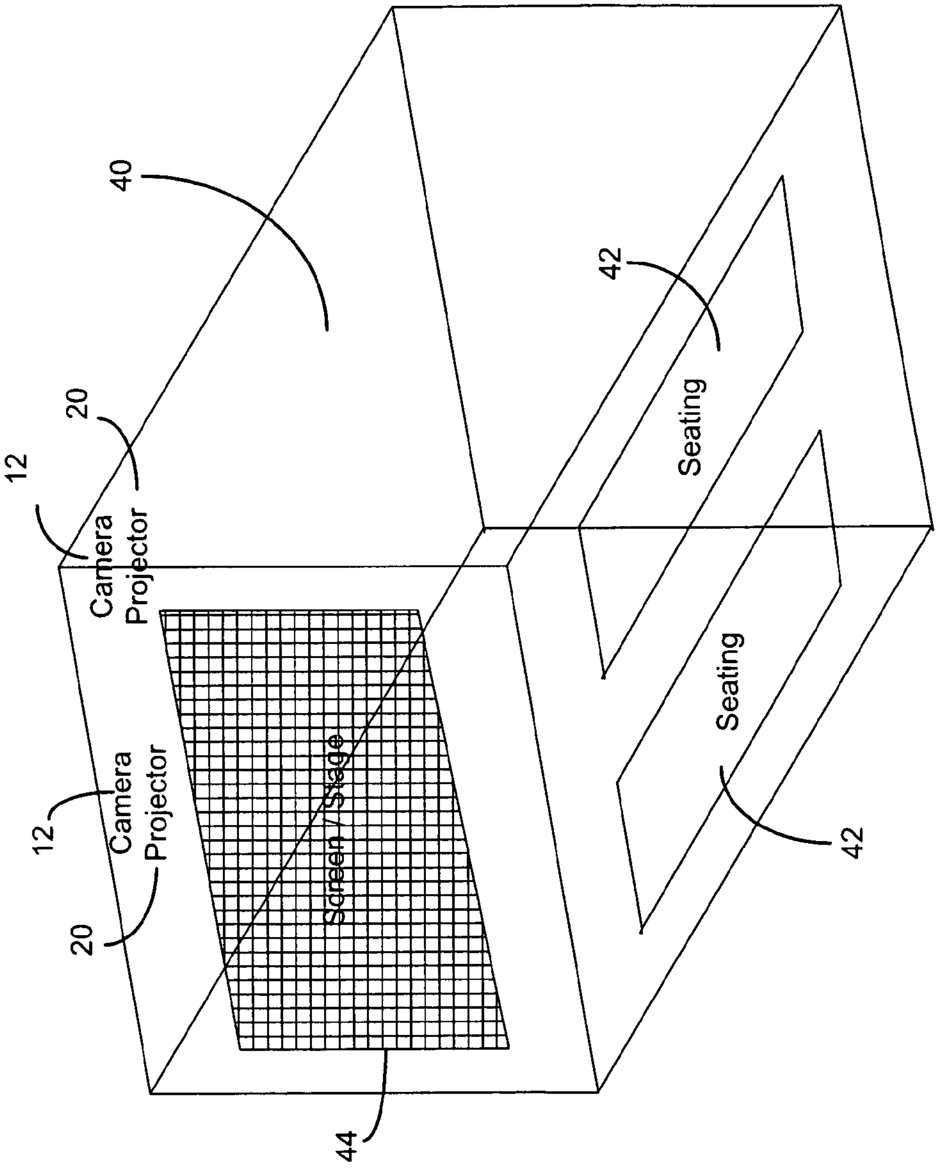
FIG. 2 is a front perspective view of an auditorium used with the display system of FIG. 1.

In one embodiment, the present invention provides a guided seating functionality to the display system 10. FIG. 2 is a front perspective view of an auditorium 40 in a first embodiment of the present invention. FIG. 2 illustrates seating 42 and a screen/stage 44. The present invention provides a system for illuminating selected seats of an audience to guide an audience member to the member's seat. The system captures an image from the camera 12 during an initial period of the show. The proper intensity of the image is acquired by adjusting the sensitivity and exposure of the camera. This sensitivity and exposure may be controlled by the computer 14. In the situation where the auditorium offers open seating, the machine vision algorithm 22 within the computer recognizes all empty seats from the captured image. These empty seats are marked internally within the computer and stored in the memory 18.

In the situation where the auditorium offers assigned seating, each audience member has the member's ticket scanned and transmitted to the computer. The computer recognizes the scanned seat. Next, the computer 14, through the machine vision algorithm determines if the scanned seat is empty or occupied and marks the seats internally. All the internally marked seats are mapped to the display projector 20 which commands a casting of a light beam or the light beam in the shape of seat number onto the empty assigned seat (for assigned seats) or empty seats (for unassigned seats). The illumination of the seat assists the audience member in finding the member's seat in the dark auditorium. Optionally, the seats that are not sold but occupied (in case of assigned seating) are illuminated with flashes of light beams to let the occupant know that he is sitting in the wrong seat.

The camera 12 and the display projector 14 are preferably placed in the center or corner of the screen or stage wall to enable a view of the audience. During the initial setup of the camera and projector, the camera and projector are calibrated to get their coordinates mapped with each other. Perspective mapping algorithms are used to match every pixel the camera is receiving to a matching point on the auditorium where the display projector can point a light beam. If the camera detects an empty chair, that specific chair or a shape within that chair may be illuminated with the projector using the calibrated mapping.

Alternatively, the projector can display information, animated graphics on the walls and ceiling of the auditorium for advertisements and information to the audience. This information may be static or dynamic based on the input from the audience, thus assisting in the interactive entertainment provided to the audience.

Figure 3:
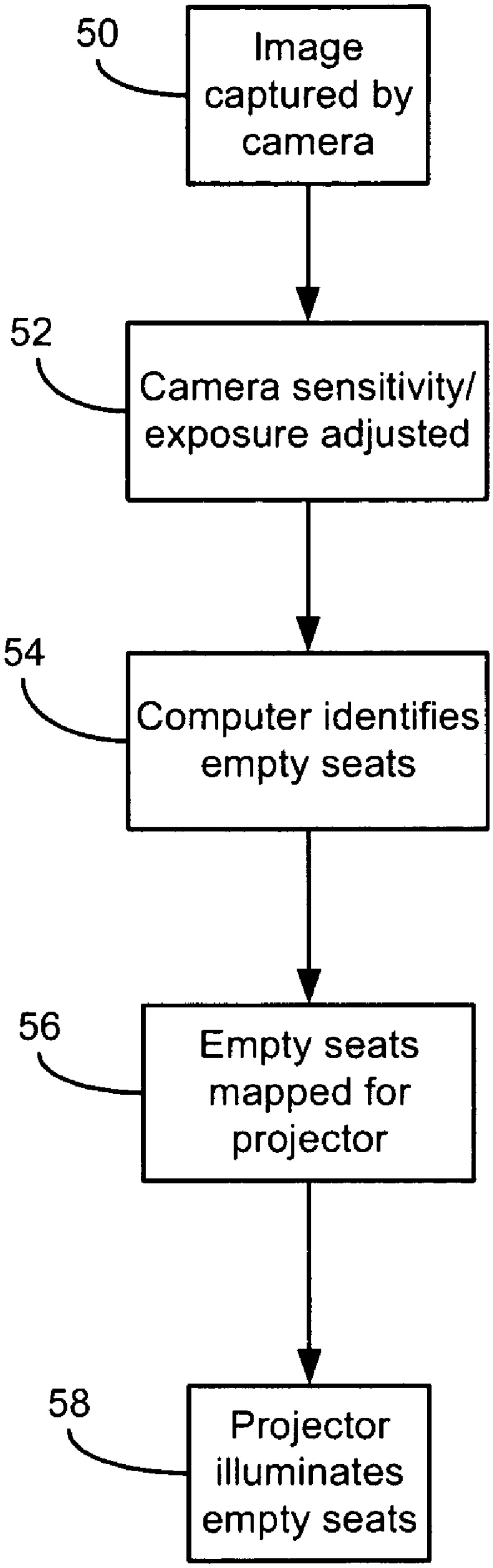
FIG. 3 is a flow chart illustrating a method of illuminating an empty seat with the auditorium using unassigned seating.

FIG. 3 is a flow chart illustrating a method of illuminating an empty seat with the auditorium using unassigned seating. With reference to FIGS. 1-3, the method will now be explained. The method begins in step 50 where an image of the auditorium is captured by the camera 12. Next, in step 52, if the image intensity is not sufficient for obtaining a good image, the computer optionally adjusts the camera sensitivity and exposure according to the illumination of the auditorium (e.g., illuminated prior to start of show or dark during the show). Next, in step 54, the computer, 14 through the machine vision algorithm 22 recognizes and identifies all the empty seats in the auditorium. Next, in step 56, the identified empty seats are mapped with the projector 20. Next, in step 58, the projector illuminates the identified empty seats.

Figure 4:
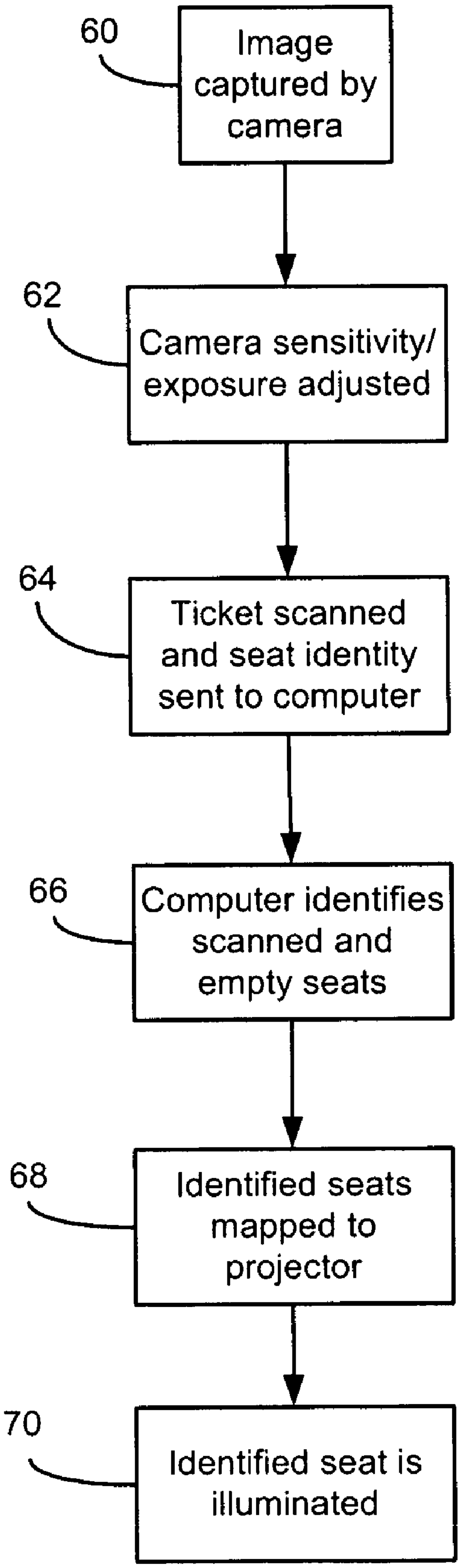
FIG. 4 is a flow chart illustrating a method of illuminating an empty seat with the auditorium using assigned seating.

FIG. 4 is a flow chart illustrating a method of illuminating an empty seat with the auditorium using assigned seating. With reference to FIGS. 1, 2, and 4, the method will now be explained. The method begins in step 60 where an image of the auditorium is captured by the camera 12. Next, in step 62, if the image intensity is not sufficient for obtaining a good image, the computer optionally adjusts the camera sensitivity and exposure according to the illumination of the auditorium (e.g., illuminated prior to start of show or dark during the show). Next, in step 64, a ticket is scanned from an audience member to identify the seat and sent to the computer 14. In step 66, the computer 14, through the machine vision algorithm 22 recognizes and identifies all the empty seats and the seats that are scanned in the auditorium. Next, in step 68, the identified scanned seats are mapped with the projector 20. Next, in step 70, the projector illuminates the identified scanned seat. In another embodiment of the present invention, the projector projects a flashing light beam on any seats identified as occupied but incorrectly occupied.

In another embodiment of the present invention, the display system 10 receives feedback from the audience and, in response to that feedback, displays information to the audience. The system utilizes the camera 12 for capturing an image of the specified area and the computer 14 for receiving the captured image. The computer analyzes the image to detect areas of the seated people. In addition, through the machine vision algorithm, the computer analyzes a gesture from each seated audience member, such as raised hands or number of fingers displayed by the audience. The system may also recognize the selection from a passive device with selection. Alternately, the system may also recognize other forms of visual answers. A question is displayed or presented to the audience, either aurally or through the screen/stage 44. Various types and uses of the question or query may be presented to the audience. The question may be conducted to obtain market research. In another embodiment, the system may provide automated quiz shows and a winner from the audience selected and awarded prizes. In another embodiment, the audience is queried for changing a store line of a movie or other type of show. Next, the image of the audience is then captured by the camera 12 during a response period following the question. If the camera is viewing from the side of the screen (see FIG. 2), perspective compensation may be applied to either the image or the chair positions. Once the perspective compensation is completed, the image is segmented to chair areas. Based on the type of user input used, different recognition algorithms identify the input from the audience and convert them to numerical results.

In one embodiment, a raised or lowered hand may indicate a response to a yes or no question. The computer 14, through the machine vision algorithm, identifies the presence of a raised arm next to the person's head/shoulder. The arm is identified by its shape and the skin color. The shape of the arm has characteristics such as straight lines with specific width range and a palm at the end of the arm with its own shape. The color of the skin is typically a high red component. In the Hue, Saturation and Intensity (HSI) space, the human skin color shows up in a certain hue range with higher red.

In another embodiment, a finger input may be used by an audience member to determine a response. The system first identifies the presence of raised arms and a presence of the audience member's palm at the end of the arm. If the palm/hand is found, the number of fingers at the end of the hand is then identified. The system may then use a combination of edges/number of edge lines and pixel level segmentation to identify the number of fingers.

In another embodiment of the present invention, the audience member may utilize a passive input device. A passive input device (not shown) with a battery and multicolor LED or mechanical slider with flags may be mounted on the arm rest of the seat. The user may select an option either through a button or a slider. The camera then recognizes the position of the slider or the lighted LED color. In this embodiment, the seats would not need to be wired to the computer system as in existing systems.

Figure 5A:
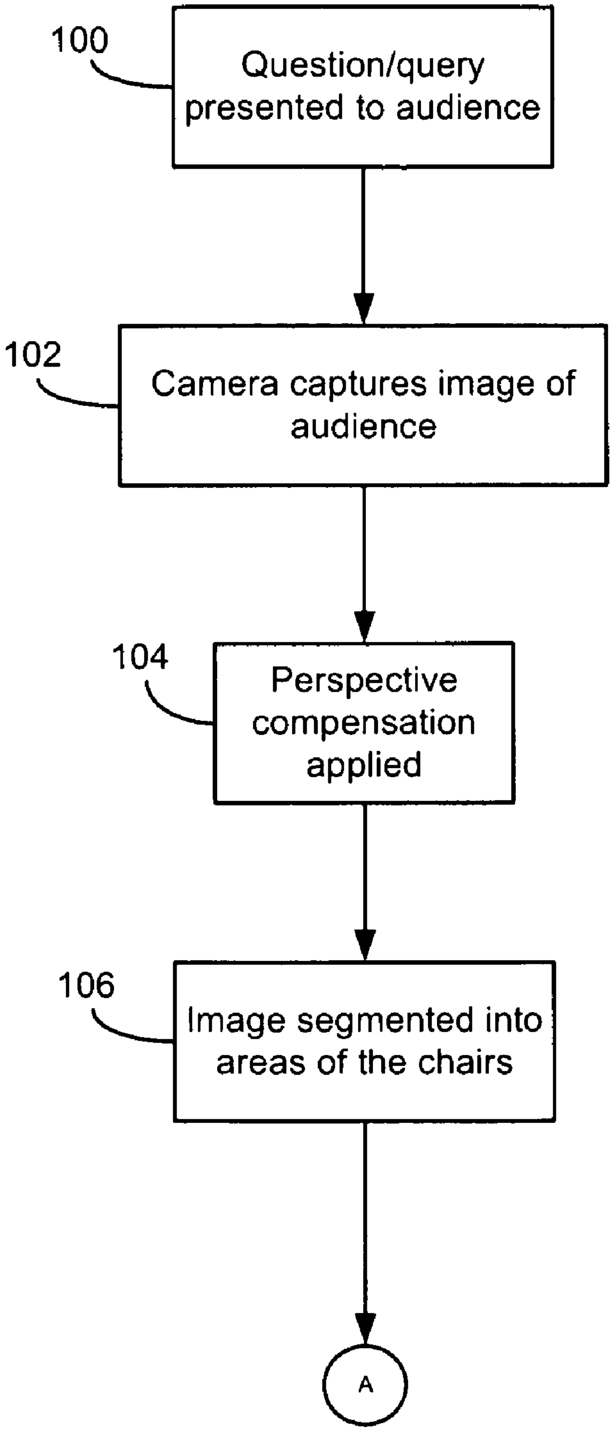
FIGS. 5A and 5B are flow charts illustrating a method of receiving feedback from the audience and displaying information in response to the feedback.
Figure 5B:
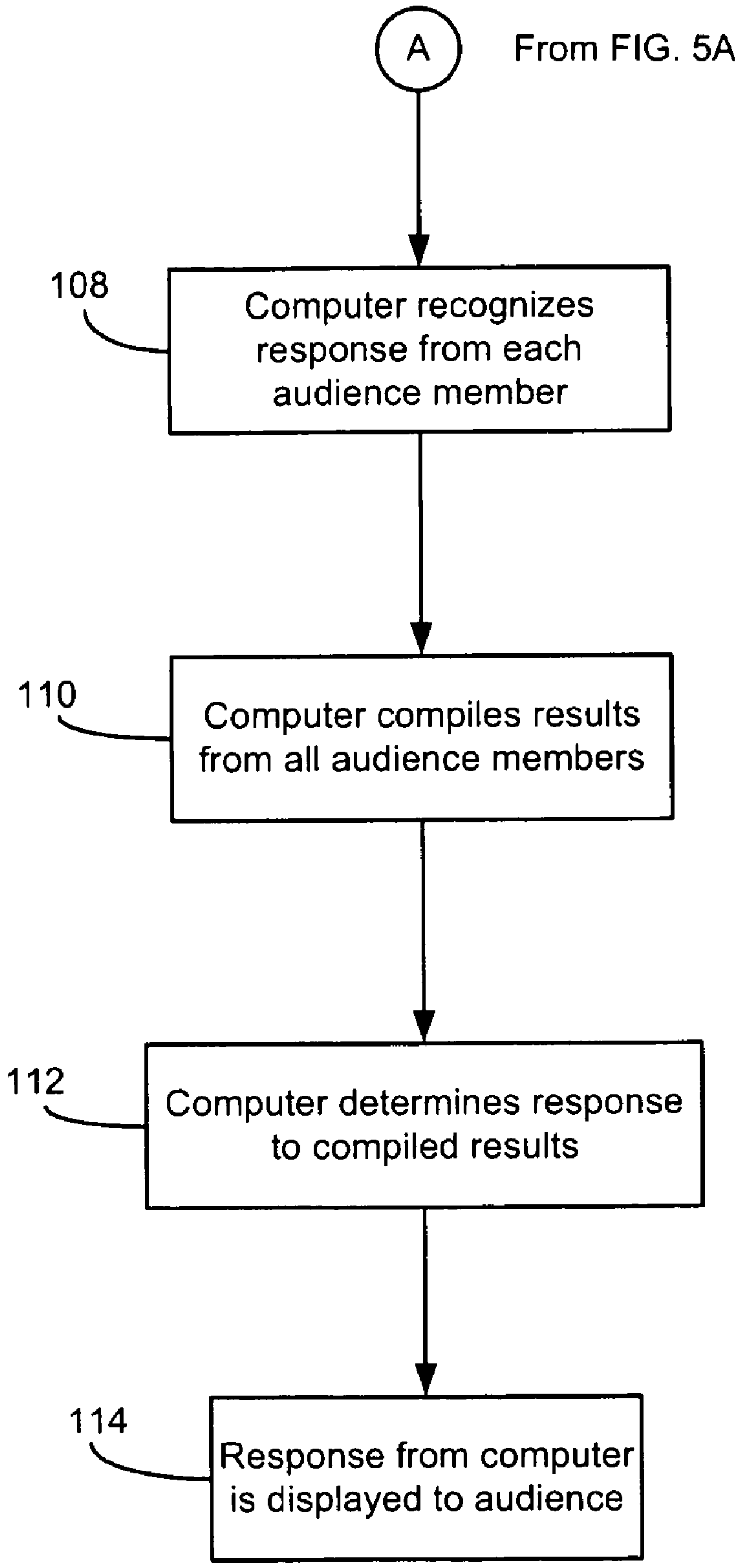

FIGS. 5A and 5B are flow charts illustrating a method of receiving feedback from the audience and displaying information in response to the feedback. With reference to FIGS. 1 and 5, the method will now be explained. The method begins in step 100 where a question or query is presented to the audience. This question may be visually displayed on the screen/stage 44 or through some other visual display. The question or query may be a survey, food order, quiz, or any other type of query. Next, in step 102, the system 10 utilizes the camera 12 for capturing an image of the specified area and the computer 14 for receiving the captured image. In step 104, if the camera is viewing from the side of the screen (see FIG. 2), perspective compensation may be applied to either the image or the chair positions. Next, in step 106, the image is segmented to chair areas and chair numbering is assigned to each segment.

The method then moves to step 108 where the computer 14, through the machine vision algorithm, recognizes the response from each audience member. Based on the type of user input used, different recognition algorithms identify the input from the audience and convert them to numerical results. In one type of user response, a raised or lowered hand may indicate a response to a yes or no question. In another type of response, a finger input may be used by an audience member to determine a response. In another input system, the audience member may utility a passive input device. However, it should be understood that the system may utilize any type of visual indicator from the audience and still remain in the scope of the present invention.

Next, in step 110, the computer compiles the results of the question. In step 112, the computer determines a response to the compiled results. Next, in step 114, the determined response is displayed to the audience through the display projector 22.

The system 10 may be utilized in any public assembly room and is not limited to an auditorium. In addition, the information may be displayed in a wide variety of ways, such as flat screen displays, projected screens, etc.

The present invention provides many advantages over existing systems. The present invention assists an audience member in locating an empty seat. In addition, for assigned seating in an auditorium, the system determined a specific seat and assists in the location of the assigned seat for the audience member. Additionally, the system may determine if an audience member is erroneously seated in a seat. Furthermore, the present invention enables the audience to provide feedback to a question or query. The system is able to recognize various responses from each audience member, and in response to the feedback, provide a display to the audience.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for illuminating a seat in an auditorium, the system comprising:

a camera for capturing an image of seats within the auditorium;

a computer for receiving the captured image of the seats, the computer analyzing the image to detect seats in the auditorium;

means for mapping seats with the captured image of the seats to determine a specified seat; and a projector for illuminated the specified seat;

whereby the computer directs the projector to illuminate the specified seat.

2. The system according to claim 1 wherein the computer includes means for determining from the captured image if a seat is empty.

3. The system according to claim 2 wherein the computer maps the empty seat as the specified seat for illumination.

4. The system according to claim 2 wherein the projector displays information on a wall or ceiling of the auditorium on a location of the empty seat.

5. The system according to claim 1 wherein projector provides a graphical representation on a wall or ceiling of the auditorium.

6. The system according to claim 1 further comprising means for scanning a ticket to determine an assigned seat for the scanned ticket.

7. The system according to claim 6 wherein the computer maps the assigned seat to a specific seat from the captured image.

8. The system according to claim 6 wherein the computer includes means for determining if an audience member is erroneously seated in the specific seat.

9. The system according to claim 8 wherein a seat where the audience member is erroneously seated is illuminated.

10. A method of illuminating a seat in an auditorium, the method comprising the steps of:

capturing an image of seats within the auditorium by a camera;

analyzing the captured image of the seats to detect seats in the image by a computer;

mapping the seats in the captured image to determine a specified seat; and illuminating the specified seat in the auditorium by a projector whereby the computer directs the projector to illuminate the specified seat.

11. The method according to claim 10 further comprising the step of determining an empty seat from the captured image.

12. The method according to claim 11 wherein the computer maps the empty seat as the specified seat for illumination.

13. The method according to claim 11 further comprising the step of displaying information by the projector onto a wall or ceiling of the auditorium on a location of the empty seat.

14. The method according to claim 10 further comprising the step of scanning a ticket to determine an assigned seat for the scanned ticket.

15. The method according to claim 14 wherein the computer maps the assigned seat to a specific seat from the captured image.

16. The method according to claim 14 further comprising the step of determining if an audience member is erroneously seated in a specific seat.

17. The method according to claim 16 further comprising the step of illuminating a seat where the audience member is erroneously seated.

* * * * *